United States Patent
Koso et al.

(10) Patent No.: US 6,831,807 B2
(45) Date of Patent: Dec. 14, 2004

(54) HEAD POSITIONER AND DISK DRIVE USING THE SAME

(75) Inventors: Hiroshi Koso, Osaka (JP); Hideki Kuwajima, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 244 days.

(21) Appl. No.: 10/288,550

(22) Filed: Nov. 5, 2002

(65) Prior Publication Data

US 2003/0117742 A1 Jun. 26, 2003

(30) Foreign Application Priority Data

Nov. 5, 2001 (JP) ........................................ 2001-339106

(51) Int. Cl.$^7$ .............................................. G11B 5/596
(52) U.S. Cl. .................................................. 360/78.05
(58) Field of Search ............................ 360/78.05, 78.04

(56) References Cited

U.S. PATENT DOCUMENTS 6,246,552 B1 * 6/2001 Soeno et al. ............. 360/294.4

FOREIGN PATENT DOCUMENTS

| JP | 60-035383 | 2/1985 |
|---|---|---|
| JP | 61-121471 | 6/1986 |
| JP | 04-144176 | 5/1992 |
| JP | 10-255418 | 9/1998 |
| JP | 11-354852 | 12/1999 |
| JP | 2001-088310 | 4/2001 |

* cited by examiner

Primary Examiner—Sinh Tran
Assistant Examiner—Mitchell R. Slavitt
(74) Attorney, Agent, or Firm—RatnerPrestia (57) ABSTRACT

A head positioner comprises a degradation detecting unit for detecting degradation of a fine motion actuator based on current flowing through a piezo element constituting the fine motion actuator and a performance recovering unit for repairing the degradation when the degradation is detected. A fine motion driver has a function of generating a fine motion driving signal, a function of generating a predetermined voltage used for detecting the degradation, and a function of outputting a high voltage signal used for repairing the degradation. Therefore, the present invention can provide a head positioner for realizing stable positioning control for a long time even when degradation of the positioning performance is generated by an electric short circuit or the like, and provide a disk drive.

16 Claims, 7 Drawing Sheets

HEAD POSITIONER AND DISK DRIVE USING THE SAME

FIELD OF THE INVENTION

The present invention relates to a head positioner having an two-stage type actuator and to a disk drive using the head positioner.

BACKGROUND OF THE INVENTION

As multimedia technology progresses, the market has recently, strongly requested a disk drive with high recording density that speedily moves a head to a target position on a disk-like recording medium to position the head and records and reproduces mass storage video information, sound information, and character information. For achieving the high-speed and high accurate head positioning, a method receives attention in which the positioning of the head is controlled by together operating two driving mechanisms, namely main and auxiliary driving mechanisms.

The main driving mechanism is mainly used for a large movement such as a seek operation or a plurality of track jumps. The main driving mechanism moves a head supporting mechanism, the head, and a head slider by rotating the head supporting mechanism around a shaft mounted to a chassis. The auxiliary driving mechanism is mainly used for high-speed and micro positioning such as tracking or one track jump. The auxiliary driving mechanism is controlled by a piezo element, namely a piezoelectric element, at the tip of the head supporting mechanism and in a narrow movable range but a wide band, and drives the head and the head slider.

The driving mechanism comprising the main driving mechanism and the auxiliary driving mechanism is generally called a two-stage actuator or a piggyback actuator. The main driving mechanism is called a coarse motion actuator, and the auxiliary driving mechanism is called a fine motion actuator.

A conventional disk drive generally employs an actuator using only a voice coil motor (VCM) as a means for moving a head. It is difficult that the actuator for moving the head across several thousands or tens of thousands of tracks is used for positioning the head with high accuracy, for example, one-tenth or less of one track. Therefore, a head positioner using a two-stage actuator is proposed as a head positioning means (for example, Japanese Patent Application Non-examined Publication No. H10-255418). In this two-stage actuator, as discussed above, a piezoelectric actuator for finely driving a piezo element with control voltage or an electromagnetic micro actuator having a structure similar to the VCM, is disposed as a fine motion actuator on a head supporting mechanism driven by the coarse motion actuator employing the VCM as a driving means. A two-stage actuator controlling method that uses both a piezoelectric effect and an inverse piezoelectric effect of a piezo element to allow the high-speed and high accurate positioning control is also proposed (for example, Japanese Patent Application Non-examined Publication No. S60-35383). In the latter method, a piezo element, namely a piezoelectric element, as the fine motion actuator is disposed on the head supporting mechanism driven by the coarse motion actuator.

Recently, a small disk drive rapidly becomes widespread as an electronic instrument is downsized to become portable, so that an actuator used for the disk drive is downsized. A method of realizing a small fine motion actuator using a piezo element formed of piezoelectric film is also proposed.

Figure 7:
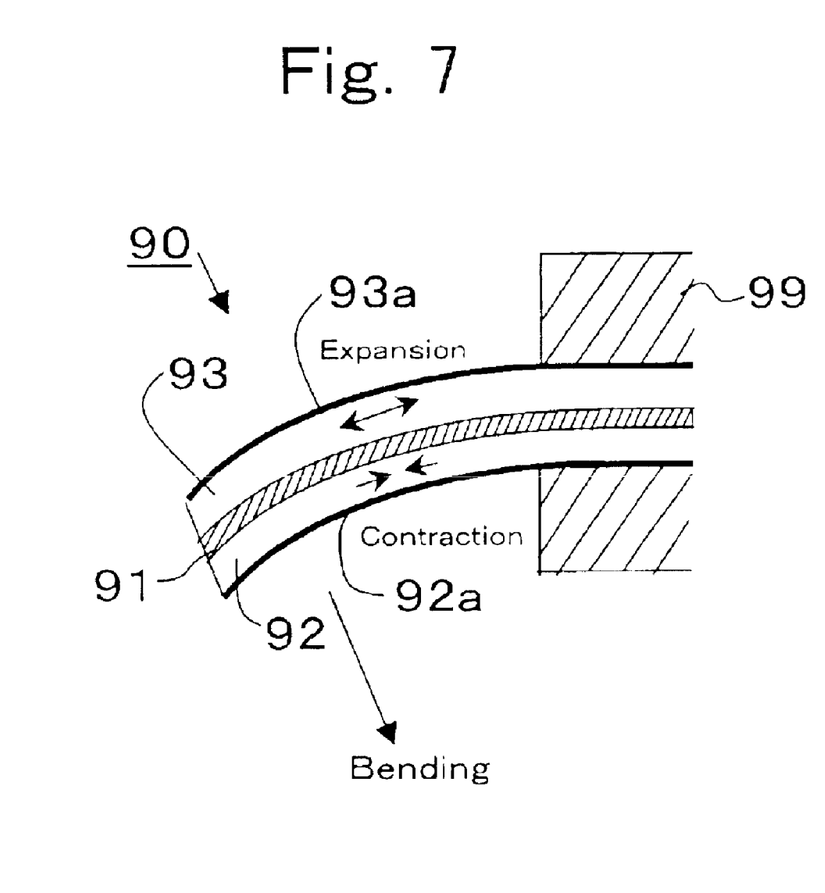
FIG. 7 is a diagram of a conventional fine motion actuator using a piezo element formed of piezoelectric film.

Referring to FIG. 7, there is shown an illustration of a conventional fine motion actuator using a piezo element having piezoelectric films. One end of fine motion actuator 90 is fixed to a tip of head supporting mechanism 99 in FIG. 7. The piezo element has two piezoelectric films 92, 93 on both sides of central material 91. Electrodes 92a, 93a are formed and plated on respective outsides of piezoelectric films 92, 93, and polarized in arbitrary directions. The piezo element has this structure and operates as fine motion actuator 90. When voltage is applied to the electrodes 92a, 93a of the piezo element, piezoelectric film 93 expands and piezoelectric film 92 contracts. The contraction and the expansion of respective piezoelectric films 92, 93 cause the piezo element to bend as shown in FIG. 7. For example, when a head is disposed at the tip of the piezo element and displaced by applying the voltage, the head at the tip of the piezo element can be moved. Fine motion actuator 90 can thus control the positioning of the head by this operation.

The thinner the piezoelectric films are, the higher electric field the piezo element obtains, at the same voltage. Piezoelectric films 92, 93 are preferably formed as thinly as possible. While, the thinner piezoelectric films 92, 93 are, the lower mechanical strengths and electric insulation characteristics of them are. The thickness of piezoelectric films 92, 93 are determined after comprehensively evaluating the distortion characteristics, mechanical strengths, and insulation characteristics. Piezoelectric films 92, 93 formed in a thin film shape are extremely fragile and are apt to suffer a defect such as a crack depending on a handling manner of them. It is therefore extremely important to detect the defect occurring in piezoelectric films 92, 93. The surface observation with a metallurgical microscope or the like is very difficult for detecting the defect such as a crack occurring in piezoelectric films 92, 93, so that an ultrasonic inspection meter is used. A method of detecting current generated by the displacement of the piezo element, displaying a result of the detection, and then finding the abnormality is also proposed (for example, Japanese Patent Application Non-examined Publication No. H11-354852).

When an impurity gets mixed with an piezoelectric film in a manufacturing stage of the piezo element, such a defect is apt to occur in the mixing part of the impurity. The defective part generated by the mixing of the impurity disadvantageously causes a crack and the degradation of an electric breakdown characteristic. When the electric breakdown characteristic degrades, the piezo element cannot sufficiently expand or construct, positioning accuracy obtained as the fine motion actuator decreases, and a positioning operation is disabled. Therefore, for preventing the degradation of electric breakdown characteristic by mixing of the impurity or the like, a method of removing a part corresponding to the defective part of the piezoelectric film in an inspecting stage is proposed. This method prevents voltage from locally being applied to the defective part(for example, Japanese Patent Application Non-examined Publication No. 2001-88310).

The method of detecting the defect in the fine motion actuator as shown in the conventional example and the method of removing the defective part by electric breakdown, however, are performed in the inspecting stage of the piezo element. A potential defect that potentially exists in the piezoelectric film and does not become obvious in the inspecting stage cannot be prevented from remaining in the inspecting stage. When a piezo element having the potential defect is used as the fine motion actuator, disadvantageously, a positioning operation of the fine motion actuator itself accelerates degradation by the defective part to degrade a displacement characteristic in a short time.

A defect that does not initially become obvious in the piezoelectric film cannot be detected in the inspecting stage. The method employing the piezo element for the positioning operation by the fine motion actuator uses mechanical distortion, so that the piezo element itself frequently suffers mechanical stress in the operation. When the piezo element itself suffers the mechanical stress, deformation such as increase of a defective part generated by an impurity progresses. When this process is repeated, a defect that does not initially become obvious can become obvious in the form of the degradation of the displacement characteristic. In other words, even when the piezo element is sound in the inspecting stage, the repeating of the displacement of the piezo element itself accelerates the degradation of the characteristic by a defective part such as an impurity, and reduces its life comparing with the life of a sound element.

The fine motion actuator employing the piezo element uses the mechanical distortion differently from an electronic component such as a capacitor. The repeating of the displacement of the piezo element itself accelerates the degradation of the characteristic by a defect that cannot be detected in the initial stage. Therefore, the degradation of the displacement characteristic, for example reduction of capacitance or electric resistance by the defective part in the film, and the breakdown of the piezo element can occur. When the fine motion actuator constituting a head positioner uses a piezo element having a potential defect, disadvantageously, positioning accuracy decreases in a short time, or the positioning operation is disabled.

SUMMARY OF THE INVENTION

The present invention addresses the problem discussed above. The present invention aims to provide a head positioner that detects degradation of the performance of a fine motion actuator by a defective part of a piezo element, allows the recovery of the degraded performance when the degradation is detected, and thus realizes stable positioning control for a long time. The present invention also aims to provide a disk drive using the head positioner.

The head positioner of the present invention has, as a head positioning means, an actuator comprising a fine motion actuator unit for performing fine positioning by the piezo element and a coarse motion actuator unit for performing coarse positioning. The head positioner further comprises a degradation detecting means and a performance recovering means. The degradation detecting means measures an electric characteristic of the piezo element and detects the existence of the degradation of the electric characteristic to detect the degradation of the performance of the fine motion actuator unit by the defective part of the piezo element. The performance recovering means, when the degradation of the electric characteristic of the piezo element is detected, applies high voltage to the piezo element to recover the performance of the fine motion actuator unit degraded by the defective part of the piezo element.

In this structure, even when the piezo element constituting the fine motion actuator unit suffers the degradation of a displacement characteristic while being built in the head positioner, the degradation detecting means detects the degradation of the displacement characteristic in the form of that of the electric characteristic. When the degradation of the electric characteristic occurs, the performance recovering means applies high voltage to the piezo element, thereby recovering the degraded performance of the fine motion actuator unit. The degradation detecting means measures the electric characteristic of the fine motion actuator unit at a predetermined time such as a starting time of the head positioner. The degradation detecting means, based on the measuring result, further detects the existence of the degradation of the piezo element constituting the fine motion actuator unit. When the degradation is detected, the high voltage generated by the performance recovering means is applied to the piezo element for a predetermined time. When the degradation is caused by an electric short circuit or the degradation of an electric breakdown characteristic in the piezo element, the applied high voltage can remove the cause. The head positioner of the present invention detects performance degradation of the fine motion actuator unit caused by a potential defect of the piezo element, and allows the recovery of the degraded performance when the degradation is detected. The head positioner can therefore realize the stable positioning control for a long time.

In the head positioner of the present invention, the degradation detecting means measures current flowing through the piezo element as the electric characteristic, and, when the current exceeds a normal current range, determines the performance degradation of the fine motion actuator unit by a defective part of the piezo element.

In this structure, the degradation detecting means measures current flowing through the fine motion actuator unit at a predetermined time such as the starting time of the head positioner. The degradation detecting means, based on the measured current, further detects the existence of the degradation of the piezo element constituting the fine motion actuator unit. When the degradation is detected, high voltage generated by the performance recovering means is applied to the piezo element for a predetermined time. When the degradation is caused by an electric short circuit or the degradation of the electric breakdown characteristic in the piezo element, the applied high voltage can remove the cause. The head positioner of the present invention detects performance degradation of the fine motion actuator unit caused by a potential defect of the piezo element, and allows the recovery of the degraded performance when the degradation is detected. The head positioner can therefore realize the stable positioning control for a long time.

In the head positioner of the present invention, the degradation detecting means measures capacitance of the piezo element as the electric characteristic, and, when the measured capacitance exceeds a normal capacitance range, determines the performance degradation of the fine motion actuator unit by a defective part of the piezo element.

In this structure, the degradation detecting means measures capacitance of the piezo element constituting the fine motion actuator unit at a predetermined time such as the starting time of the head positioner. The degradation detecting means, based on the detected capacitance, further detects the existence of the degradation of the piezo element. When the degradation is detected, the high voltage generated by the performance recovering means is applied to the piezo element for a predetermined time. When the degradation is caused by an electric short circuit or degradation of the electric breakdown characteristic in the piezo element, the applied high voltage can remove the cause. The head positioner of the present invention detects performance degradation of the fine motion actuator unit caused by a potential defect of the piezo element, and allows the recovery of the degraded performance when the degradation is detected. The head positioner can therefore realize the stable positioning control for a long time.

In the head positioner of the present invention, the performance recovering means applies high voltage of alternating current to the piezo element when the performance degradation of the fine motion actuator unit by a defective part of the piezo element is detected.

Comparing with the case that high voltage of direct current is applied to the piezo element, the applying of the high voltage of alternating current reduces stress applied to the piezo element by the high voltage, and can prevent the performance degradation of the fine motion actuator unit caused by application of the high voltage.

In the head positioner of the present invention, the piezo element constituting the fine motion actuator unit is formed of piezoelectric film.

This structure can realize a small fine motion actuator unit and a head positioner allowing stable positioning control for a long time. In the head positioner, the degradation detecting means and the performance recovering means detect the performance degradation of the fine motion actuator unit caused by a potential defect of the piezo element, and can recover the degraded performance when the degradation is detected.

The disk drive of the present invention has the head positioner.

This structure can realize the stable disk drive having a long life that detects the performance degradation of the fine motion actuator unit caused by a potential defect of the piezo element, and can recover the degraded performance when the degradation is detected.

DETAILED DESCRIPTION OF THE INVENTION

A head positioner in accordance with an exemplary embodiment of the present invention will be described hereinafter with reference to the accompanying drawings, taking a magnetic disk drive as an example.
(Exemplary Embodiment)

Figure 1:
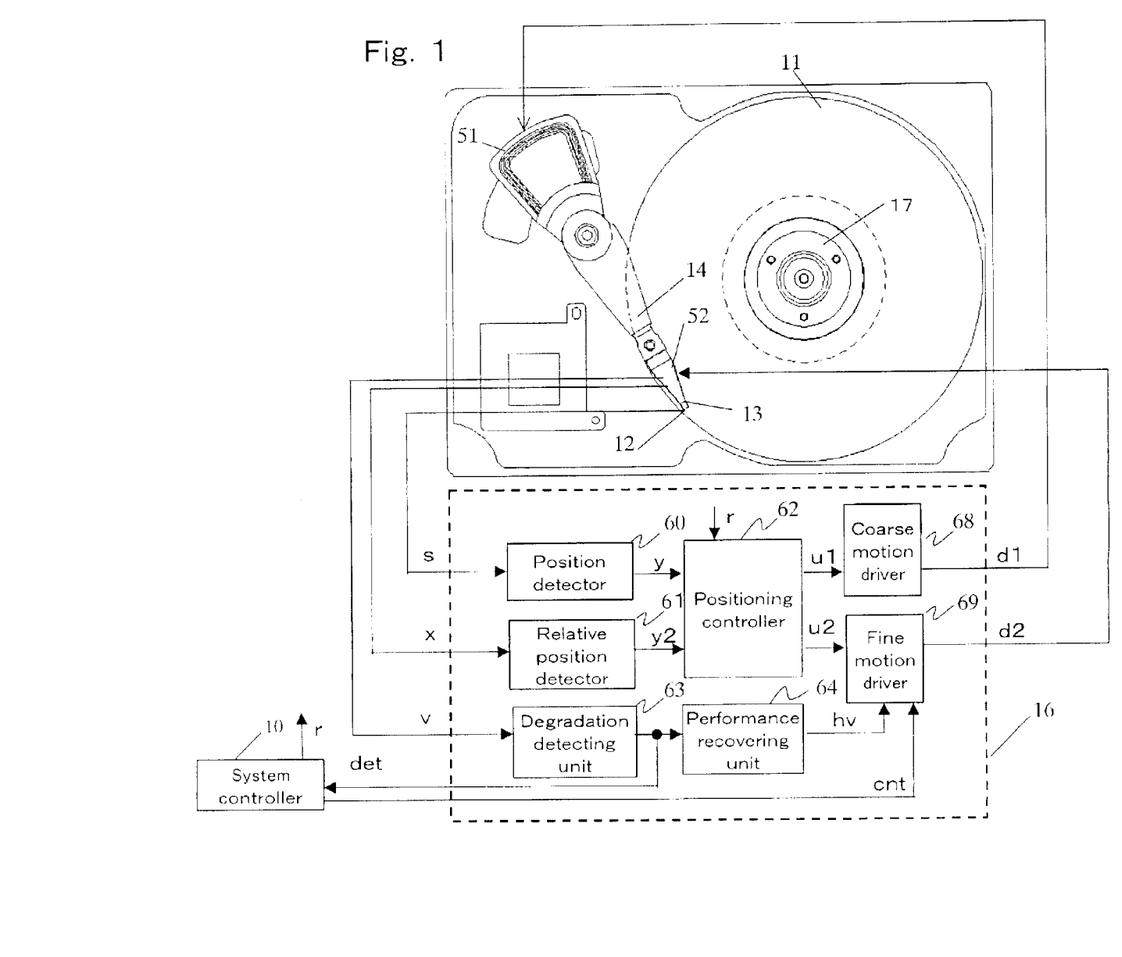
FIG. 1 is a block diagram of a magnetic disk drive including a head positioner in accordance with an exemplary embodiment of the present invention.

FIG. 1 is a block diagram of a head positioner in accordance with an exemplary embodiment of the present invention.

In FIG. 1, magnetic head 12 (it is hereinafter called a head) for recording and reproducing information on magnetic disk 11 (it is hereinafter called a disk), namely one of disk-like recording media, is integrally mounted to the tip of head slider 13. Head slider 13 is disposed at the tip of fine motion actuator 52 as a fine motion actuator unit, and fine motion actuator 52 is connected to the tip of head supporting mechanism 14. Head supporting mechanism 14 is driven about a rotating shaft disposed in a magnetic disk drive body by coarse motion actuator 51 as a coarse motion actuator unit, and positions head 12 in cooperation with fine motion actuator 52. A positioning mechanism in the head positioner has, as a head positioning means, a two-stage actuator comprising coarse motion actuator 51 and fine motion actuator 52. Coarse motion actuator 51 moves head 12 at the tip by rotating head supporting mechanism 14 with a voice coil motor or the like, and is used mainly for large movement such as a seek operation or a plurality of track jumps. Fine motion actuator 52 comprises a piezoelectric element or an electrostrictive element (it is hereinafter called a piezo element), for example, a piezo element. Fine motion actuator 52 controls a position in a small movable range but a wide band, thereby rapidly moving head 12 at the tip. Fine motion actuator 52 is mainly used for high-speed and fine positioning such as tracking or one track jump. Head 12 records and reproduces information on disk 11 rotated by rotation operating mechanism 17.

The positioning mechanism in the head positioner is driven for positioning in response to a control signal from controlling unit 16. Controlling unit 16 generates the control signal, based on relative displacement signal "y2" corresponding to a displacement amount of fine motion actuator 52, present position signal "y" generated by position detector 60, and target position signal "r" indicated for a desired positioning operation. Position detector 60 reads servo information recorded on disk 11 out of head 12, and generates present position signal "y" indicating a present position of head 12 based on the servo information. Relative position detector 61 receives displacement detecting signal "x" corresponding to the displacement amount of fine motion actuator 52, and generates relative displacement signal "y2" in response to the displacement amount.

Positioning controller 62 generates a position error signal indicating a position error from a target position based on present position signal "y" and target position signal "r" indicated from system controller 10 for controlling the entire magnetic disk drive. Positioning controller 62 also performs a filtering process with a predetermined transmission characteristic, and an amplifying process of the position error signal and relative displacement signal "y2". Positioning controller 62 generates coarse motion control signal "u1" used for controlling coarse motion actuator 51, and fine motion control signal "u2" used for controlling fine motion actuator 52. Coarse motion driver 68 receives coarse motion control signal "u1", converts coarse motion control signal "u1" to coarse motion driving signal "d1" used for driving coarse motion actuator 51, and drives coarse motion actuator 51 in response to coarse motion driving signal "d1". Fine motion driver 69 receives fine motion control signal "u2", converts fine motion control signal "u2" to fine motion driving signal "d2" used for driving fine motion actuator 52, and drives fine motion actuator 52 in response to fine motion driving signal "d2". Controlling unit 16 roughly positions head 12 by driving coarse motion actuator 51 in response to coarse motion driving signal "d1" and finely positions head 12 by driving fine motion actuator 52 in response to fine motion driving signal "d2".

The head positioner comprises degradation detecting unit 63 as a degradation detecting means for the degradation of a positioning performance of fine motion actuator 52, namely the degradation of a displacement characteristic of the piezo element. And the head positioner comprises performance recovering unit 64 as a performance recovering means for recovering the degraded performance when the degradation is detected. Degradation detecting unit 63 receives characteristic detection signal "v" corresponding to current flowing through the piezo element constituting fine motion actuator 52. For detecting variation of an electric characteristic of the piezo element, especially a degradation state of the characteristic, the head positioner measures the current flowing through the piezo element as characteristic detection signal "v" corresponding to a voltage converted from the current. Degradation detecting unit 63 compares characteristic detection signal "v" with a reference voltage signal indicating a predetermined reference value, and determines the occurrence of the degradation when characteristic detection signal "v" exceeds the reference value indicated by the reference voltage signal. Degradation detecting unit 63 inspects the degradation state of the displacement characteristic of the piezo element in response to characteristic detection signal "v", and outputs degradation detection signal "det" based on the inspection result. Performance recovering unit 64 receives degradation detection signal "det", and, when degradation detection signal "det" indicates the detection of the degradation, outputs high voltage signal "hv" for recovering the degraded characteristic of the piezo element. When degradation detection signal "det" does not indicate the detection of the degradation, performance recovering unit 64 does not output high voltage signal "hv". Fine motion driver 69 has not only a function of outputting fine motion driving signal "d2", but also has a function of generating a predetermined voltage for inspecting the characteristic based on characteristic detection signal "v" and a function of outputting high voltage signal "hv" for repairing the degradation of the characteristic. Each function of fine motion driver 69 is controlled based on changeover command signal "cnt" from system controller 10 for controlling the entire magnetic disk drive. In other words, fine motion driver 69 outputs fine motion driving signal "d2" or high voltage signal "hv" used for driving fine motion actuator 52 in response to changeover command signal "cnt" from system controller 10.

As discussed above, the head positioner has degradation detecting unit 63, performance recovering unit 64, and fine motion driver 69. The head positioner thus detects the degradation of the displacement characteristic of the piezo element constituting fine motion actuator 52, and, when the degradation occurs, recovers the degraded characteristic of the piezo element, namely fine motion actuator 52.

Operations of the head positioner of the present exemplary embodiment will be described hereinafter. In the operations, the head positioner can detect degradation of a characteristic of the piezo element constituting fine motion actuator 52, and, when the degradation is detected, recover the degraded characteristic of the piezo element.

Degradation detecting unit 63, for inspecting the displacement characteristic of the piezo element, measures current flowing through the piezo element as characteristic detection signal "v" corresponding to the voltage converted from the current. In other words, degradation detecting unit 63 measures the current flowing through the piezo element as an electric characteristic of the piezo element. For detecting the current, system controller 10 commands fine motion driver 69 through changeover command signal "cnt" to output a signal of a predetermined constant voltage value from fine motion driver 69. A predetermined timing of the degradation detection and performance recovery, for example, every starting time of the magnetic disk drive, is set in system controller 10. System controller 10 commands the operations of the degradation detection and performance recovery with this timing. Degradation detecting unit 63 detects current flowing when the signal of the constant voltage is transmitted to the piezo element. Degradation detecting unit 63 inspects whether or not a current indicated by characteristic detection signal "v" is within a predetermined range. Degradation detecting unit 63 determines degradation of the piezo element when the current is inspected to be out of the predetermined range, and informs performance recovering unit 64 and system controller 10 through degradation detection signal "det" of the degradation detection, namely the determination result. When the piezo element is normal, the current indicated by characteristic detection signal "v" is within the predetermined range set as a normal value. When the electric characteristic of the piezo element degrades, the current is changed by the degradation and goes out of the predetermined range. Degradation detecting unit 63 detects the degradation of the piezo element and gives notice of the detection as discussed above, thereby operating as the degradation detecting means.

Performance recovering unit 64 generates high voltage signal "hv" having a predetermined high voltage, and outputs high voltage signal "hv" to fine motion driver 69 on receiving the notification of the degradation detection from degradation detecting unit 63. System controller 10, on receiving the notification of the degradation detection from degradation detecting unit 63, commands fine motion driver 69 through changeover command signal "cnt" to output the high voltage signal "hv". When the degradation is detected, high voltage signal "hv" generated by performance recovering unit 64 is applied to the piezo element through fine motion driver 69. Performance recovering unit 64 thus functions as the performance recovering means.

When the current indicated by characteristic detection signal "v" is inspected to be within the predetermined range, degradation detecting unit 63 determines the absence of the degradation, and informs performance recovering unit 64 and system controller 10 of the determination result, namely the absence of the degradation, through degradation detection signal "det". System controller 10, on receiving the notification of the absence, commands fine motion driver 69 through changeover command signal "cnt" to output fine motion driving signal "d2". The head positioner then starts the positioning operation of head 12.

Even when the piezo element constituting fine motion actuator 52 is built in the head positioner to be set in a used state, the operations discussed above allow the detection of the degradation of the piezo element and the repair of the degradation when the degradation is detected. Thus, the head positioner can regularly inspect a state of the piezo element constituting fine motion actuator 52 even after the piezo element is built in the head positioner. When the occurrence of the degradation is recognized by the inspection, the degradation can be recovered. High voltage signal "hv" used for recovering the degradation is transmitted only when the degradation is recognized, so that stress by high voltage signal "hv" does not accelerate the degradation.

As discussed above, a piezo element, namely a piezoelectric element, may have a potential defect that does not become obvious in the inspecting stage. When a piezo element having such a potential defect is used for the fine motion actuator, a positioning operation of the fine motion actuator itself stresses the defective part to cause deformation such as increase of the defective part. The defective part has a pinhole in a piezoelectric film constituting the piezo element or an impurity mixed in forming the piezoelectric film, for example. The defect becomes obvious in the form of a crack or an electrical short circuit as the defective part enlarges or deforms. When the piezo element having such a defect is exposed to an environment having high humidity, dew formation occurs, moisture penetrates into the pinhole or the crack, or a displacement characteristic can be degraded.

Degradation detecting unit 63 of the head positioner uses micro current flowing through the piezo element to detect the degradation caused by the crack or the electrical short circuit that becomes obvious in a process discussed above. When the degradation becomes obvious as the electrical short circuit, the head positioner burns out the electrical short circuit part in the piezo element by applying high voltage signal "hv" generated by performance recovering unit 64 from fine motion driver 69 to fine motion actuator 52. When the defective part degrades an electric breakdown characteristic, also, the head positioner applies high voltage signal "hv" to fine motion actuator 52 to locally remove an electrode near the defect to prevent an influence of the degradation of the electric breakdown characteristic. When the dew formation causes the degradation of the displacement characteristic, the application of high voltage signal "hv" can cause self-heating of the piezo element to remove an influence of the moisture. High voltage signal "hv" is applied only when the degradation of the displacement characteristic is detected, so that applying frequency of high voltage signal "hv" can be minimized and the degradation by the stress by high voltage signal "hv" is not accelerated.

As discussed above, the head positioner comprises degradation detecting unit 63, performance recovering unit 64, and fine motion driver 69. The head positioner can detect degradation of the performance of the fine motion actuator caused by the defective part of the piezo element and recover the degraded performance when the degradation is detected. The head positioner can therefore realize stable positioning control for a long time.

Figure 2:
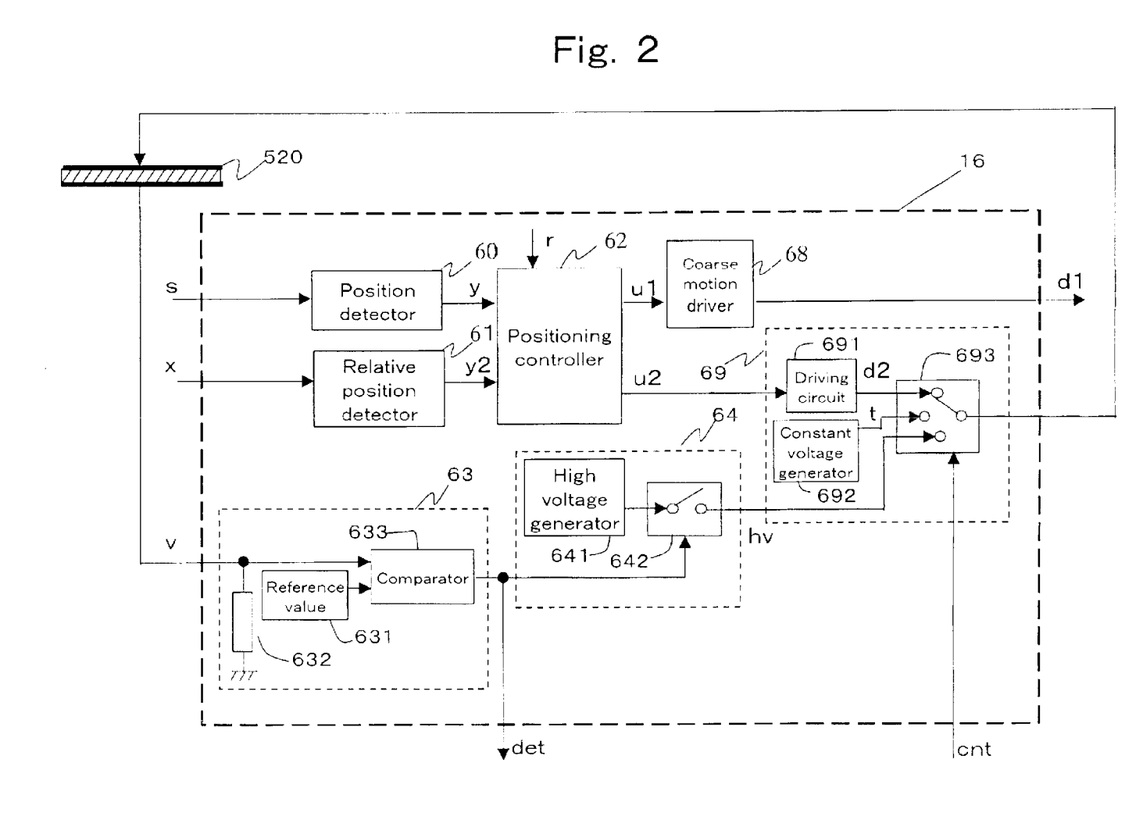
FIG. 2 is a specific block diagram of a control unit of the head positioner.

FIG. 2 is a block diagram showing a more specific configuration of controlling unit 16 in the head positioner. In FIG. 2, elements similar to those in FIG. 1 are denoted with the same reference numbers. For the sake of simplicity, in the configuration, controlling unit 16 drives piezo element 520 of fine motion actuator 52.

In FIG. 2, degradation detecting unit 63 comprises reference value circuit 631 for outputting a reference voltage signal indicating a predetermined reference value, resistor 632, and comparator 633 for comparing the reference voltage signal from reference value circuit 631 with characteristic detection signal "v" at one end of resistor 632. For detecting degradation of piezo element 520, fine motion driver 69 transmits inspection signal "t" having a predetermined signal level to piezo element 520 in response to a command of changeover command signal "cnt" from system controller 10. At this time, degradation detecting unit 63 receives characteristic detection signal "v" corresponding to the current flowing through the piezo element. One end of resistor 632 is connected to one end of piezo element 520, the other end of resistor 632 is grounded, and thus piezo element 520 is continuously connected to resistor 632. Degradation detecting unit 63 thus receives, in the form of characteristic detection signal "v", a voltage across resistor 632 that is generated by current flowing through resistor 632 in response to inspection signal "t".

At a predetermined time, for example, a starting time of the magnet disk drive, fine motion driver 69 applies a constant voltage of 1 V as inspection signal "t" of a predetermined constant level to continuously interconnected piezo element 520 and resistor 632. A normal resistance of the piezo element comprising a piezoelectric film is generally about 10 MΩ. When the resistance of resistor 632 is 10 kΩ, a voltage across resistor 632 is about 1 mV. When a micro electric short circuit occurs in piezo element 520, the resistance of piezo element 520 decreases to a value not higher than 1 MΩ, for example, about 10 kΩ. The voltage across resistor 632 in this case is about 0.5 V. Degradation detecting unit 63 uses this principle to detect degradation such as the electric short circuit.

Figure 3:
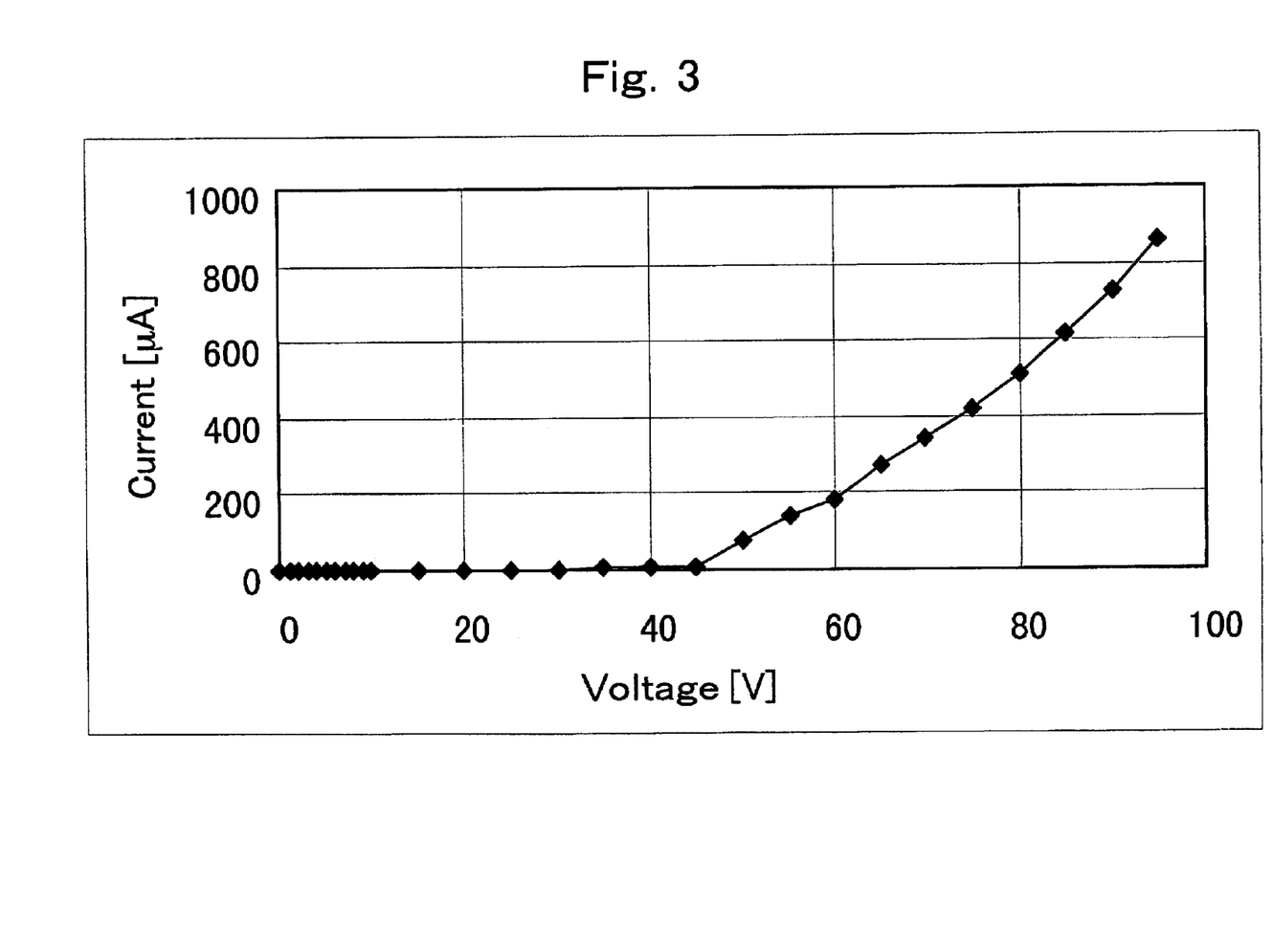
FIG. 3 is a characteristic chart of the relations between supplied voltage to the piezo element and current.
Figure 4:
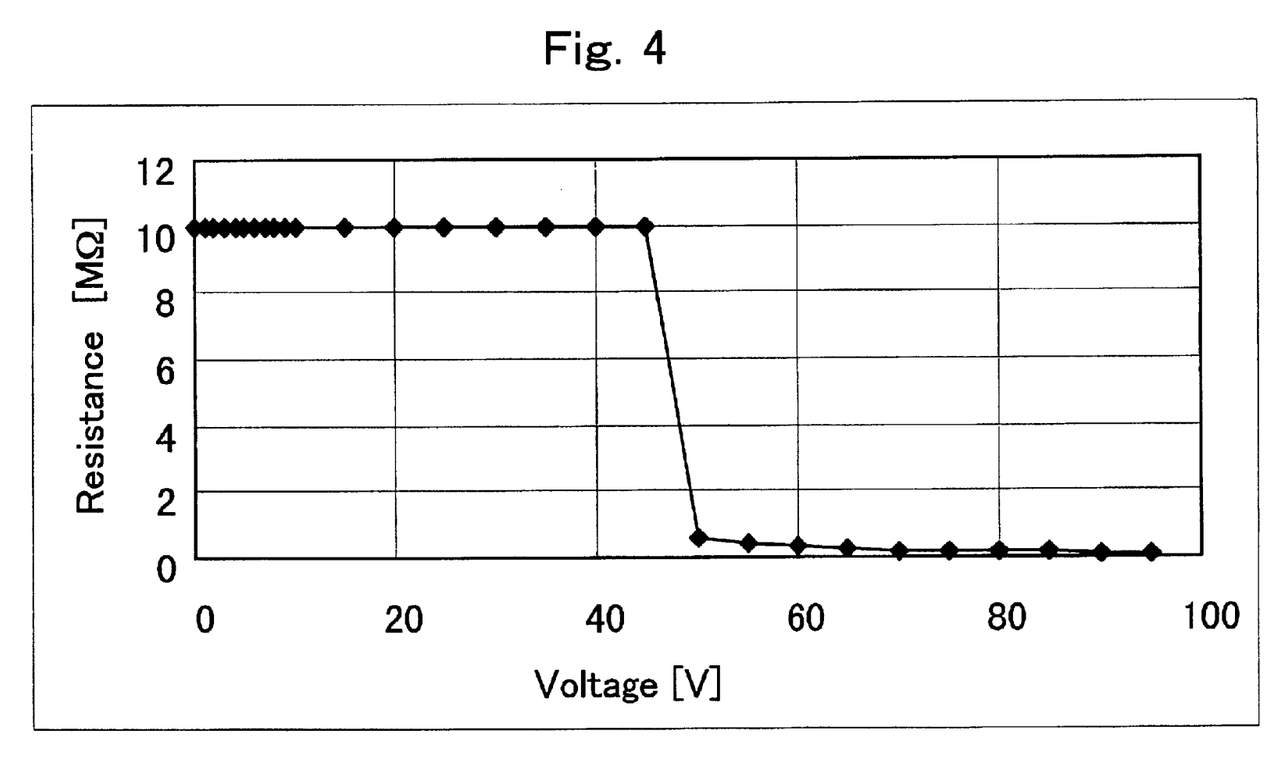
FIG. 4 is a characteristic chart of the relations between supplied voltage to the piezo element and resistance.

FIG. 3 shows the relations between voltage "V" which supplied to the piezoelectric film as the piezo element 520, and current "I". In FIG. 3, current flowing through piezo element increases abruptly at about 50V. In the voltage range of 0V to about 50V, current flowing through piezo element is constant. FIG. 4 shows the relations between voltage "V" and resistance "R" for the same piezo element shown in FIG. 3. This shows that the resistance "R" is constant value about 10 MΩ in the voltage range of 0V to about 50V. But above 50V, resistance value changes abruptly under 1 MΩ to 100 KΩ. Therefore to utilize the piezo element as the fine motion actuator, it is preferable to use under the voltage of changing point of resistance. So using under this voltage, it is possible to prevent the breakdown of the piezo element. That is, it is possible to detect degradation such as the electric short circuit by measuring the resistance across the piezo element.

Figure 5:
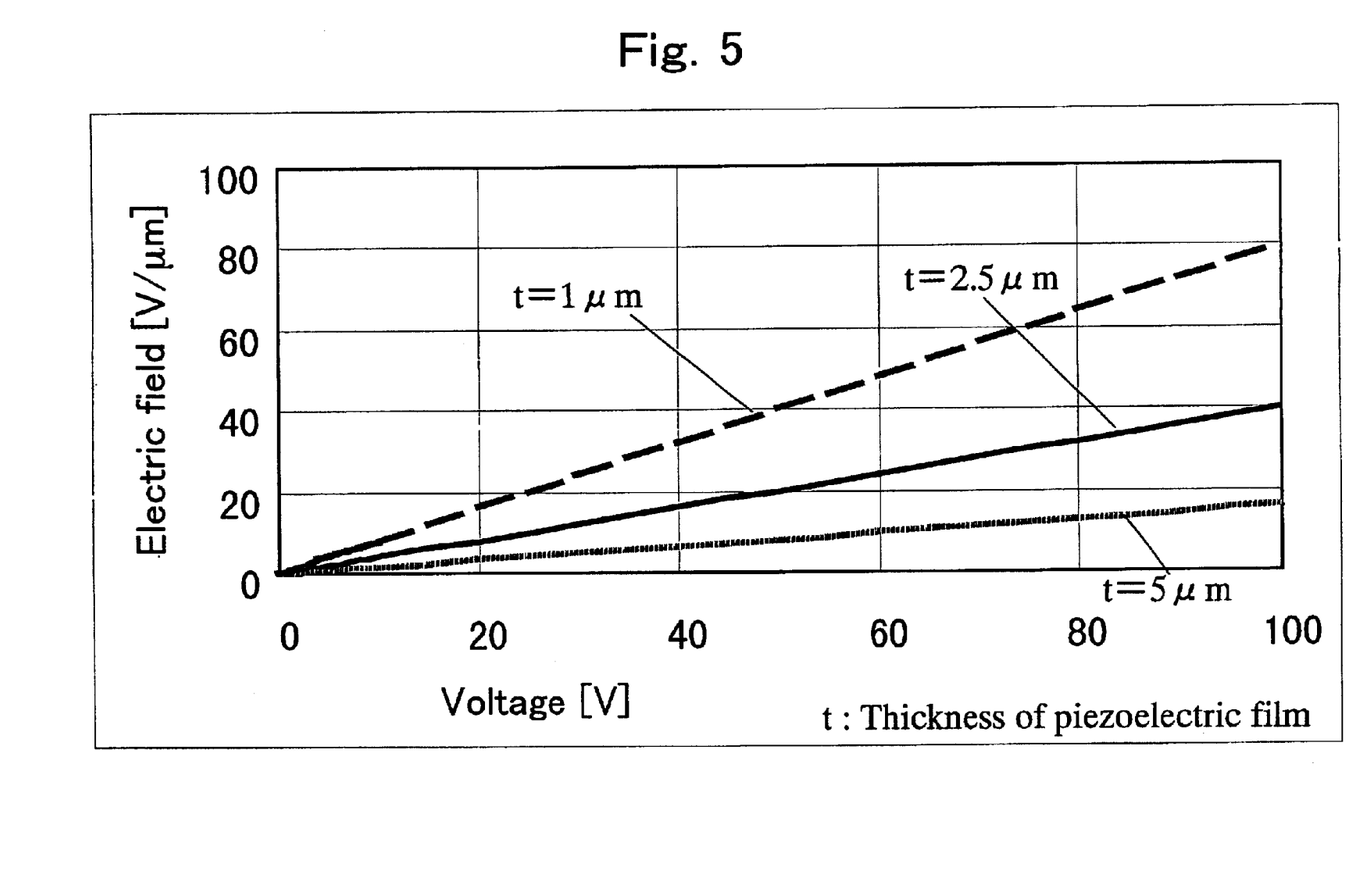
FIG. 5 is a characteristic chart of the relations between supplied voltage to the piezo element with varied thickness and electric field.

That changing point of resistance shown in FIG. 4 varies by character and thickness of the piezo element. This means that it is important to understand this characteristic and utilize for driving and degradation detecting. FIG. 5 shows the relations between voltage "V" which supplied to the piezoelectric film as the piezo element, and electric field in the range 1 to 5 μm for the thickness of piezo element. Here, it is preferable to choose the thickness of piezo element to about 2.5 μm. For one example of the supplied voltage to the piezo element, with multiplying the safety coefficient 0.2, threshold value of the supplied voltage is decided ±10V and bias voltage is decided 0V under decomposition voltage. Then with this condition, the fine motion actuator is used under current flowing 1 μA.

That is, it can be decided the electric characteristic in normal condition of piezo element is for example that current "I" divided by voltage "V" is under $-6^{th}$ power of 10. This means that the electric characteristic in normal condition is over the resistance value 1 MΩ. Also, it is possible to use the piezo element after the burn-in for example 500 hours operation under the condition 85° C. temperature and 90% humidity. And it is preferable that the electric characteristic is measured by supplying the voltage V, and the relations of V/t between voltage V and thickness t of the piezo element is under $7^{th}$ power of 10.

Comparator 633 compares characteristic detection signal "v" across resistor 632 with an output signal from reference value circuit 631, and determines the detection of the degradation when characteristic detection signal "v" exceeds the level of the output signal from reference value circuit 631. A normal range of characteristic detection signal "v" in this example is from zero level to a level of the reference voltage signal transmitted from reference value circuit 631. Comparator 633 informs performance recovering unit 64 and system controller 10 of the determination result, namely the presence or the absence of the degradation, as degradation detection signal "det".

Performance recovering unit 64 comprises high voltage generator 641 for generating high voltage and switch 642. High voltage generator 641 generates high voltage signal "hv" enough to burn out an element causing the electrical short circuit part in piezo element 520. For preventing breakdown of piezo element 520 itself, preferably, high voltage signal "hv" has a voltage equal to or lower than a decomposition voltage of piezo element 520 and is an alternating current signal from 1 kHz to 10 kHz. And also, it is preferable that this high voltage of alternating current is zero offset, or under decomposition voltage. On receiving the notification of the degradation detection from degradation detecting unit 63, switch 642 outputs high voltage signal "hv" from performance recovering unit 64.

Fine motion driver 69 comprises driving circuit 691 for converting fine motion control signal "u2" to fine motion driving signal "d2", constant voltage generator 692 for outputting inspection signal "t" of a predetermined constant signal level used for detecting current flowing through piezo element 520, and selector 693 for selecting a signal to be output in response to a command of changeover command signal "cnt" from system controller 10. In a normal positioning operation, selector 693 selects an output of driving circuit 691 in response to a command from system controller 10, outputs fine motion driving signal "d2" for positioning to piezo element 520, namely fine motion actuator 52, and controls the positioning. When a starting time or the like of the magnetic disk drive is preset, however, selector 693 selects an output of constant voltage generator 692. For detecting current flowing through piezo element 520, fine motion driver 69 outputs inspection signal "t" with a predetermined constant voltage. Degradation detecting unit 63 uses the constant voltage to detect occurrence of the degradation of piezo element 520. When the occurrence of the degradation is detected, changeover command signal "cnt" from system controller 10 commands selector 693 for a predetermined time to select high voltage signal "hv". Fine motion driver 69 transmits high voltage signal "hv" to piezo element 520, and burns out the electric short circuit part.

Therefore, even when piezo element 520 constituting fine motion actuator 52 has a potential defect, the configuration of controlling unit 16 shown in FIG. 2 allows the detection of performance degradation of fine motion actuator 52 caused by the defect, and allows the recovery of the degraded performance when the degradation is detected. The head positioner can therefore realize the stable positioning control for a long time.

Figure 6:
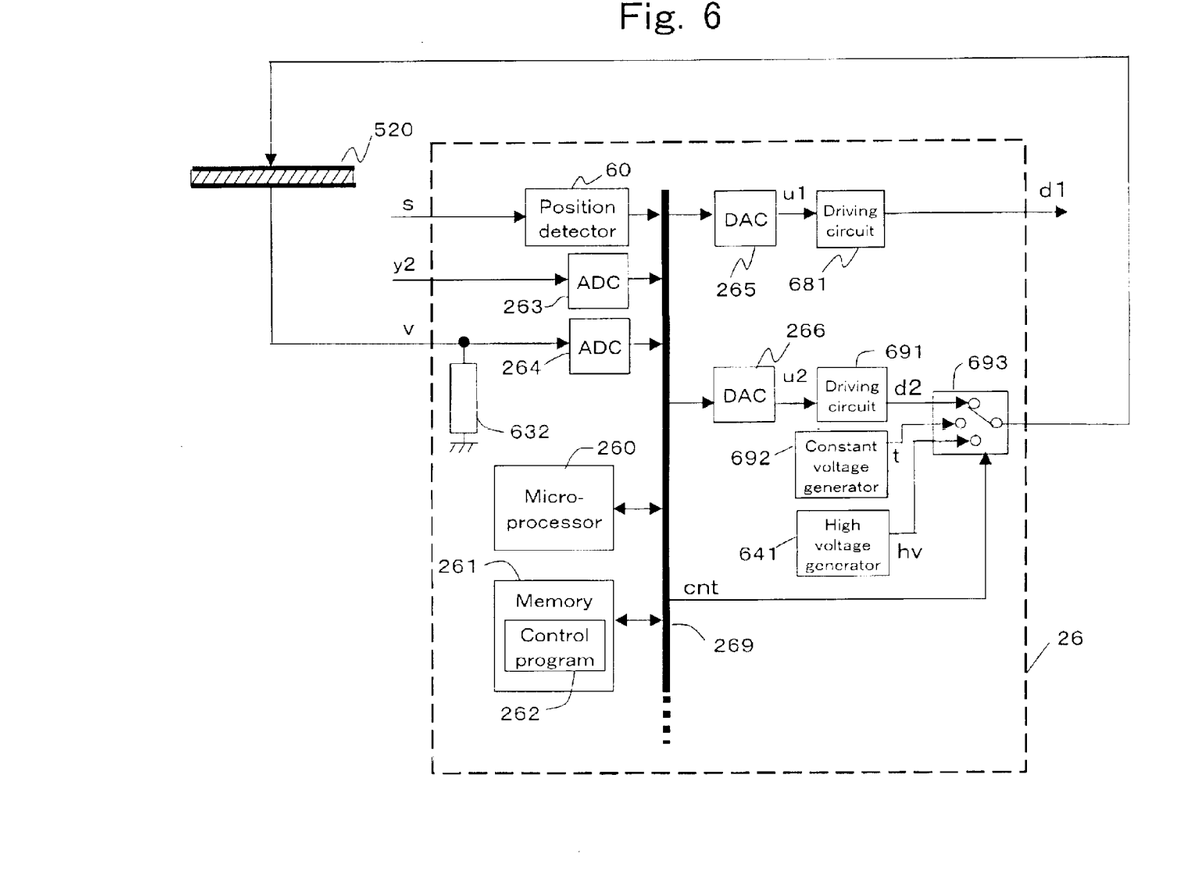
FIG. 6 is a specific block diagram of another control unit of the head positioner.

FIG. 6 is a block diagram showing another specific configuration of controlling unit 16 in the head positioner. In FIG. 3, elements similar to those in FIG. 2 are denoted with the same reference numbers. The controlling unit in FIG. 3 is denoted with 26. For the sake of simplicity, in the configuration, controlling unit 26 drives piezo element 520 of fine motion actuator 52. Controlling unit 26 differs from controlling unit 16 described in FIG. 2 in that controlling unit 26 performs a digital process with a microprocessor to control the positioning, detect degradation of piezo element 520, and repair the degradation. Controlling unit 26 has a configuration different from that of controlling unit 16 shown in FIG. 2, but performs the same operation as a positioner and obtains the same effect.

In FIG. 6, controlling unit 26 comprises microprocessor 260, memory 261, AD (analog-digital) converter 263, AD converter 264, DA converter 265, DA converter 266, driving circuit 681, driving circuit 691, and common bus 269 for data communication among them. Memory 261 stores control program 262 for controlling the positioning of head 12 and detecting and repairing the degradation of piezo element 520. Microprocessor 260 reads and executes control program 262 to control the positioning and detect and repair the degradation of piezo element 520.

Microprocessor 260 sequentially reads control program 262 and executes the read contents. A procedure of detecting and repairing the degradation of piezo element 520 is especially realized in steps discussed below.

In step 1, microprocessor 260 commands through changeover command signal "cnt" that inspection signal "t" from constant voltage generator 692 is supplied to piezo element 520.

In step 2, microprocessor 260 reads characteristic detection data obtained by converting characteristic detection signal "v" from analog to digital. Similarly to controlling unit 16, one end of resister 632 is connected to one end of piezo element 520, and the other end of resister 632 is grounded. Current flowing through piezo element 520 of fine motion actuator 52 provides a voltage across resister 632. This voltage in the form of characteristic detection signal "v" is fed into AD converter 264 for converting an analog signal to digital data. Microprocessor 260 reads digital characteristic detection data through common bus 269.

In step 3, microprocessor 260 determines whether or not a value of the characteristic detection data is within a predetermined range, and, when the value is not within the predetermined range, determines and stores the occurrence of the degradation.

In step 4, microprocessor 260 proceeds to step 5 when the occurrence of the degradation is determined in step 3, and proceeds to step 8 when the non-occurrence of the degradation is determined.

In step 5, microprocessor 260 commands through changeover command signal "cnt" that high voltage signal "hv" from high voltage generator 641 is supplied to piezo element 520. This operation is continued for a predetermined time period or repeated a predetermined number of times.

In step 6, microprocessor 260 determines whether or not a value of the characteristic detection data is within a predetermined range, and, when the value is not within the predetermined range, determines and stores the impossibleness of the degradation repair.

In step 7, microprocessor 260 returns to a main program when the degradation repair is determined to be impossible in step 6, and proceeds to step 8 when the degradation repair is determined to be finished.

In step 8, microprocessor 260 commands through changeover command signal "cnt" that fine motion driving signal "d2" from driving circuit 691 is supplied to piezo element 520. Microprocessor 260 generates fine motion control data used for generating fine motion driving signal "d2" by executing a program for the positioning control. DA converter 266 for converting digital data to an analog signal converts the generated fine motion control data to fine motion control signal "u2". Fine motion driving signal "d2" is thus output.

In step 9, microprocessor 260 returns to the main program.

When the degradation repair is possible, the main program calls the program for the positioning control, and microprocessor 260 performs the positioning control.

Therefore, even when piezo element 520 constituting fine motion actuator 52 has a potential defect, the configuration of controlling unit 26 shown in FIG. 6 allows the detection of performance degradation of fine motion actuator 52 caused by the potential defect, and allows the recovery of the degraded performance when the degradation is detected. The head positioner can therefore realize the stable positioning control for a long time.

Degradation detecting unit 63 uses the current flowing through piezo element 520 constituting fine motion actuator 52 to detect degradation of the positioning performance of fine motion actuator 52 in the present invention; however, degradation detecting unit 63 may use another electric characteristic, for example, the change of the capacitance by the degradation. In the latter method, for detecting the degradation of the piezo element for example, a resonance circuit is formed of the piezo element because the piezo element is a kind of capacitor, and the degradation detecting unit measures frequency of the resonance circuit to indirectly measure the change of the capacitance by the degradation.

The head positioner is formed integrally with disk 11 for recording and reproducing information, a rotating mechanism 17 for rotating disk 11, system controller 10 for controlling the entire disk drive, and a body for holding them. Thus, even when the piezo element constituting fine motion actuator 52 has a potential defect, the disk drive can detect performance degradation of fine motion actuator 52 caused by the potential defect and recover the degraded performance when the degradation is detected. The disk drive can therefore realize the stable positioning control for a long time.

Head 12 for recording and reproducing information has been described in the present invention. At this time, one head may perform both recording and reproducing of the information, or head slider 13 may have two heads of which one is used for recording and the other is used for reproducing.

The head positioner and the disk drive record and reproduce information on one surface of disk 11 in the present invention; however, the head positioner and the disk drive may record and reproduce information on both surfaces of disk 11, or may have a plurality of disks and rotate the disks in a lump for the recording and reproducing.

The magnetic disk drive has been described in the present invention; however, the present invention is not limited to this, and an optical disk drive employing, for example, an optical head may be used.

As discussed above, the head positioner in the present invention comprises a degradation detecting unit as a degradation detecting means for detecting degradation of the positioning performance of a fine motion actuator and a performance recovering unit as a performance recovering means for recovering the degradation when the degradation is detected. A fine motion driver has a function of outputting a fine motion driving signal, a function of generating a predetermined voltage used for detecting the degradation, and a function of outputting a high voltage signal used for repairing the degradation. Even when the piezo element constituting a fine motion actuator suffers degradation of a displacement characteristic while being built in the head positioner, the degradation detecting unit detects the degradation of the piezo element as the degradation of an electric characteristic. When the degradation of the characteristic is detected, the performance recovering unit applies the high voltage signal to the piezo element to recover the degradation.

The degradation detecting unit detects current flowing through the piezo element constituting the fine motion actuator or capacitance of the piezo element at a predetermined time such as a starting time of the magnetic disk drive. Based on the current or the capacitance, the degradation detecting unit determines the presence or absence of the degradation of the piezo element. When the presence of the degradation is determined, the performance recovering unit generates the high voltage signal and applies it to the piezo element via the fine motion driver for a predetermined time. When degradation is determined to be caused by an electric short circuit or degradation of an electric breakdown characteristic in the piezo element, the high voltage signal can remove them. In other words, the cause of the manifest degradation of the positioning performance can be removed, and the degraded positioning performance can be recovered. The head positioner of the present invention can detect performance degradation of a fine motion actuator caused by the potential defect of the piezo element, and recover the degraded performance when the degradation is detected. The present invention can thus provide a head positioner for realizing stable positioning control for a long time, and provide a disk drive using it.

What is claimed is:

1. A head positioner having, as a head positioning means, an actuator including a fine motion actuator unit for fine positioning with a piezo element and a coarse motion actuator unit for coarse positioning, said head positioner comprising:

degradation detecting means for detecting performance degradation of the fine motion actuator unit by a defective part of the piezo element by measuring an electric characteristic of the piezo element and detecting the existence of the degradation of the electric characteristic; and performance recovering means for recovering degraded performance of the fine motion actuator unit by the defective part of the piezo element by applying a high voltage to the piezo element when the degradation of the electric characteristic of the piezo element is detected.

2. A head positioner according to claim 1, wherein the piezo element constituting the fine motion actuator unit is formed of a piezoelectric film.

3. A head positioner according to claim 2, wherein said performance recovering means applies the high voltage of alternating current to the piezo element when the performance degradation of the fine motion actuator unit by the defective part of the piezo element is detected.

4. A head positioner according to claim 1, wherein said degradation detecting means measures current flowing through the piezo element as the electric characteristic, and determines the performance degradation of the fine motion actuator unit by the defective part of the piezo element when a value of the measured current exceeds a normal current range.

5. A head positioner according to claim 4, wherein the piezo element constituting the fine motion actuator unit is formed of a piezoelectric film.

6. A head positioner according to claim 5, wherein said performance recovering means applies the high voltage of alternating current to the piezo element when the performance degradation of the fine motion actuator unit by the defective part of the piezo element is detected.

7. A head positioner according to claim 1, wherein said degradation detecting means measures capacitance of the piezo element as the electric characteristic, and determines the performance degradation of the fine motion actuator unit by the defective part of the piezo element when the measured capacitance exceeds a normal capacitance range.

8. A head positioner according to claim 7, wherein the piezo element constituting the fine motion actuator unit is formed of a piezoelectric film.

9. A head positioner according to claim 8, wherein said performance recovering means applies the high voltage of alternating current to the piezo element when the performance degradation of the fine motion actuator unit by the defective part of the piezo element is detected.

10. A disk drive having a head positioner having, as a head positioning means, an actuator including a fine motion actuator unit for fine positioning with a piezo element and a coarse motion actuator unit for coarse positioning, said head positioner comprising:

degradation detecting means for detecting performance degradation of the fine motion actuator unit by a defective part of the piezo element by measuring an electric characteristic of the piezo element and detecting the existence of the degradation of the electric characteristic; and performance recovering means for recovering degraded performance of the fine motion actuator unit by the defective part of the piezo element by applying a high voltage to the piezo element when the degradation of the electric characteristic of the piezo element is detected.

11. A head positioner according to claim 1,
wherein said electric characteristic in normal condition is that the relations of I/V between voltage V for driving said fine motion actuator unit and current I flowing through said piezo element is under $-6^{th}$ power of 10.

12. A head positioner according to claim 1,
wherein said electric characteristic in normal condition is that resistance of said piezo element is over 1 MΩ.

13. A head positioner according to claim 1,
wherein said electric characteristic in normal condition is that resistance of said piezo element is under 1 MΩ, after 500 hours operation under the condition 85° C. temperature and 90% humidity.

14. A head positioner according to claim 5,
wherein said electric characteristic is measured by supplying the voltage V, and the relations of V/t between voltage V and thickness t of said piezo element is under $7^{th}$ power of 10.

15. A head positioner according to claim 9,
wherein said high voltage of alternating current is zero offset, or under decomposition voltage.

16. A head positioner according to claim 8,
wherein said electric characteristic is measured by supplying the voltage V, and the relations of V/t between voltage V and thickness t of said piezo element is under $7^{th}$ power of 10.

* * * * *